United States Patent [19]
Richardson et al.

[11] Patent Number: 6,081,762
[45] Date of Patent: Jun. 27, 2000

[54] CRUISE CONTROL SYSTEM

[75] Inventors: Michael Julian Richardson, Redditch; Philip Alexander Barber, Sollhull; Paul John King, Leicester, all of United Kingdom

[73] Assignee: Jaguar Cars Limited, Allesley, United Kingdom

[21] Appl. No.: 08/825,161

[22] Filed: Mar. 26, 1997

[30] Foreign Application Priority Data

Mar. 26, 1996 [GB] United Kingdom .................... 9606384

[51] Int. Cl.⁷ .................................................... B60K 31/00
[52] U.S. Cl. ............................ 701/93; 180/170; 180/271; 701/96
[58] Field of Search .................................... 701/1, 36, 41, 701/70, 93, 96, 301; 340/435, 903; 180/169, 170, 271

[56] References Cited

U.S. PATENT DOCUMENTS

| | | | |
|---|---|---|---|
| 4,519,469 | 5/1985 | Hayashi et al. . | |
| 5,396,426 | 3/1995 | Hibino et al. ............................. | 701/96 |
| 5,400,864 | 3/1995 | Winner et al. ............................. | 180/169 |
| 5,629,851 | 5/1997 | Williams et al. ............................. | 701/96 |

FOREIGN PATENT DOCUMENTS

| | | |
|---|---|---|
| 0146851 | 7/1985 | European Pat. Off. . |
| 0 605 104 | 7/1994 | European Pat. Off. . |
| 35023301A1 | 7/1985 | Germany . |
| WO9510053A | 4/1995 | WIPO . |

*Primary Examiner*—William A. Cuchlinski, Jr.
*Assistant Examiner*—Edward Pipala
*Attorney, Agent, or Firm*—Paul K. Godwin

[57] ABSTRACT

A cruise control system for a motor vehicle includes a sensor for monitoring a target vehicle moving in front of the equipped vehicle, a sensor for monitoring the speed of the equipped vehicle and a sensor for monitoring steering manoeuvres of the equipped vehicle, the cruise control system controlling the throttle and brake systems of the vehicle to control the speed of the vehicle. The cruise control system is switchable between a cruise mode in which it will maintain a set cruising speed when the path in front of the vehicle is clear and a follow mode in which it will maintain a preset headway with a target vehicle in front of the equipped vehicle. The system is switched from the cruise mode to the follow mode when a target vehicle moves inside the preset headway, the system switching from the follow mode to the cruise mode when the target vehicle is lost or moves outside a preset headway. When switching from the follow mode to the cruise mode, the cruise control system applies a resume acceleration to accelerate the equipped vehicle back to the set cruising speed, the resume acceleration rate being adjusted as a function of steering manoeuvres carried out by the equipped vehicle.

10 Claims, 2 Drawing Sheets

CRUISE CONTROL SYSTEM

BACKGROUND TO THE INVENTION

The present invention relates to cruise control systems and in particular to cruise control systems which include a distance sensor by which the system may monitor vehicles travelling in front of the equipped vehicle and adjust the speed of the equipped vehicle to maintain a set time based distance with a vehicle in front of the equipped vehicle.

With cruise control systems of this type in a cruise mode, the cruise control system will maintain the speed of the vehicle at that set by the driver. If however the distance sensor detects a slower moving vehicle in front of the equipped vehicle, the cruise control system will go into follow mode and will adjust the speed of the equipped vehicle to maintain a set time based distance or headway, to the vehicle ahead.

With such systems, problems are encountered when either the equipped vehicle and/or the vehicle in front of the equipped vehicle performs steering manoeuvres. For example, when vehicles enter a corner, because of the limited width of the field of view of the distance sensor, the distance sensor may lose the target vehicle in front of the equipped vehicle, at which time the cruise control system will go back to cruise mode and accelerate the vehicle at a pre-defined rate to reattain the set cruising speed. Such acceleration in a corner may be disconcerting to the driver of the equipped vehicle and may bring the equipped vehicle uncomfortably close to the target vehicle.

When however the equipped vehicle pulls out to overtake the target vehicle, it is desirable that the equipped vehicle resumes the cruise mode so that it will accelerate passed the target vehicle. If however the target vehicle pulls out into a faster lane of a multi-lane highway, if the equipped vehicle were to resume the cruise mode, then this may cause the equipped vehicle to overtake the target vehicle on the inside which may again be disconcerting to the driver of the equipped vehicle.

In accordance with one aspect of the present invention, a cruise control system for a motor vehicle comprises means for monitoring a target vehicle moving in front of the equipped vehicle, means for monitoring the speed of the equipped vehicle and means for monitoring steering manoeuvres of the equipped vehicle, the cruise control system controlling the throttle and/or brake systems of the vehicle to control the speed of the vehicle, the cruise control system being switchable between; a cruise mode in which it will maintain a set cruising speed when the path in front of the vehicle is clear and a follow mode in which it will maintain a preset headway with a target vehicle in front of the equipped vehicle; the system being switched from the cruise mode to the follow mode when the target vehicle moves inside the preset headway; the system switching from the follow mode to the cruise mode when the target vehicle is lost or moves outside the preset headway, the cruise control system applying a resume acceleration to accelerate the equipped vehicle back to the set cruising speed, the resume acceleration rate being adjusted as a function of steering manoeuvres carried out by the equipped vehicle.

SUGARY OF THE INVENTION

In accordance with the present invention, if the target vehicle is lost while the equipped vehicle and target vehicle are travelling in a straight path, the equipped vehicle may be accelerated back to its set cruising speed at a preset maximum resume acceleration rate, in conventional manner. However, if the target vehicle is lost while the equipped vehicle is performing a steering manoeuvre, for example negotiating a bend, the resume acceleration of the equipped vehicle may be reduced.

In accordance with a preferred embodiment of the invention, the resume acceleration rate upon resumption of cruise mode may be determined as a function of the lateral acceleration experienced by the equipped vehicle in a steering manoeuvre. However other criteria, for example the steering angle of the equipped vehicle, may alternatively be used to determine the appropriate resume acceleration rate. Furthermore the direction of movement of the target vehicle, which may be measured by monitoring the azimuth angle of the target vehicle, may also be used to determine an appropriate resume acceleration rate.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
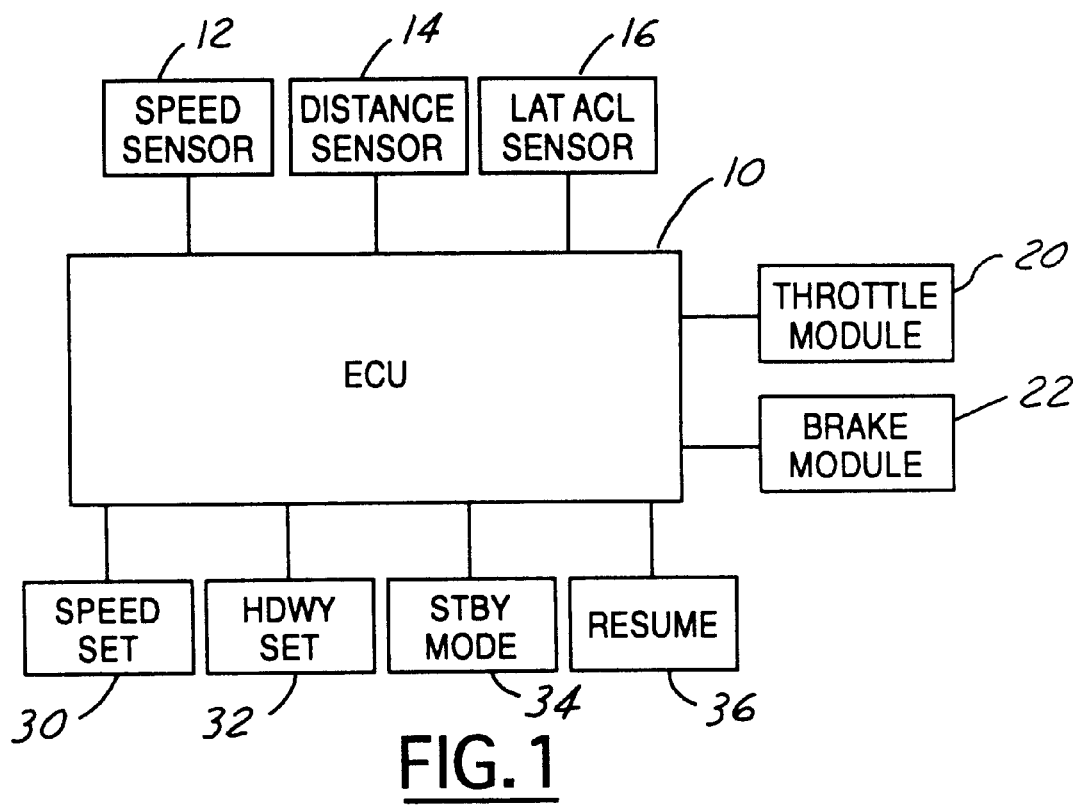
FIG. 1 illustrates diagrammatically a cruise control system in accordance with the present invention.

As illustrated in FIG. 1, a cruise control system for a motor vehicle comprises an ECU 10. A speed sensor 12 monitors the speed of the vehicle and sends signals to the ECU 10 indicative of the vehicle speed. A distance sensor 14 which may comprise of radar or laser system, monitors vehicles moving in front of the equipped vehicle and sends signals to the ECU 10 indicative of the range and speed of such vehicles. Preferably, a multi-beam or scanned radar or laser system is used which may also detect the azimuth angle of the target vehicle. A lateral acceleration sensor 16 sends signals to the ECU 10 indicative of the lateral forces experienced by the occupants of the equipped vehicle.

The ECU controls a throttle module 20 and a brake module 22, by which the throttle and braking systems of the vehicle may be controlled to control the speed of the vehicle.

When the cruise control system is in operation, if the road in front of the vehicle is clear, the cruise control system goes into a cruise mode in which it will automatically control both throttle and brakes of the vehicle to maintain the speed of the vehicle to a cruising speed which may be set by the driver, by means of a cruising speed setting control 30.

If the distance sensor 14 detects a slower moving vehicle in front of the equipped vehicle, then the cruise control module will go into follow mode in which it will maintain a set time based distance or headway with the target vehicle in front of the equipped vehicle. The headway may be set automatically by the cruise control system on the basis of a predetermined calibrated distance dependent on the vehicle speed. Alternatively, the headway may be adjustable and may be set by the driver by switch means 32, to suit the road conditions and driver preferences. In the latter case, the headway may typically vary to provide a spacing between the equipped vehicle and the target vehicle of from 1.2 seconds to 2.5 seconds.

Figure 2:
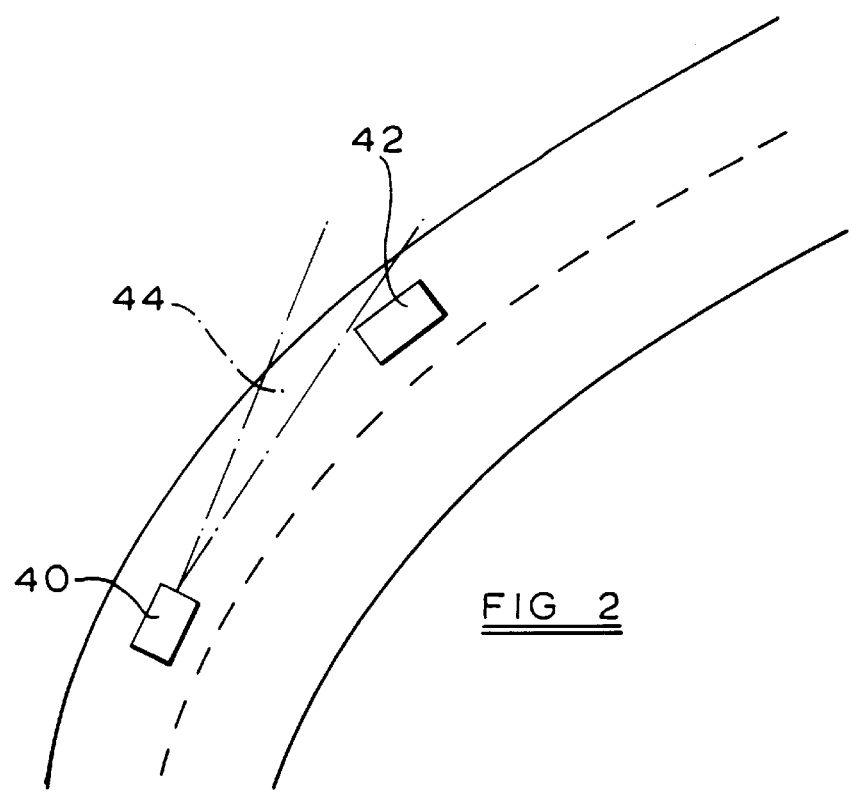
FIG. 2 illustrates an equipped vehicle following a target vehicle around a curve of constant curvature.

The manner of operation of the cruise control system described so far, which corresponds to the functioning of a conventional cruise control system, will provide acceptable automatic control of the vehicle speed on straight roads or on roads with bends of relatively large curvature. However, as illustrated in FIG. 2, for tighter bends, when the cruise control is in the follow mode, it is possible that the target vehicle 42 will move outside beam 44 of the distance sensor 14 of the equipped vehicle 40. With conventional systems, upon losing the target vehicle 42, the cruise control system will go from the follow mode to the cruise mode and accelerate the vehicle back to the set cruising speed at a preset resume acceleration rate, typically of the order of 1.0 m/s$^2$. Acceleration of the vehicle in this manner will be disconcerting to the driver and may cause the equipped vehicle 40 to catch up with the target vehicle 42, so that the target vehicle 42 is again detected by the cruise control system and the cruise control system will revert to the follow mode, requiring high levels of deceleration. This cycle may be repeated several times as the vehicles 40 and 42 go round the bend, giving a very uncomfortable ride.

In accordance with the present invention if, while in the follow mode, the cruise control system loses the target vehicle 42, and the lateral acceleration sensor 16 indicates to the ECU 10, that the equipped vehicle 40 is negotiating the bend, then the cruise control system will resume the cruise mode and will accelerate the equipped vehicle 40 back towards the set cruising speed but at reduced acceleration rate. In this manner, the rate at which the equipped vehicle 40 catches the target vehicle 42 will be reduced, as will the increase in lateral acceleration, thus providing a smoother ride.

Figure 3:
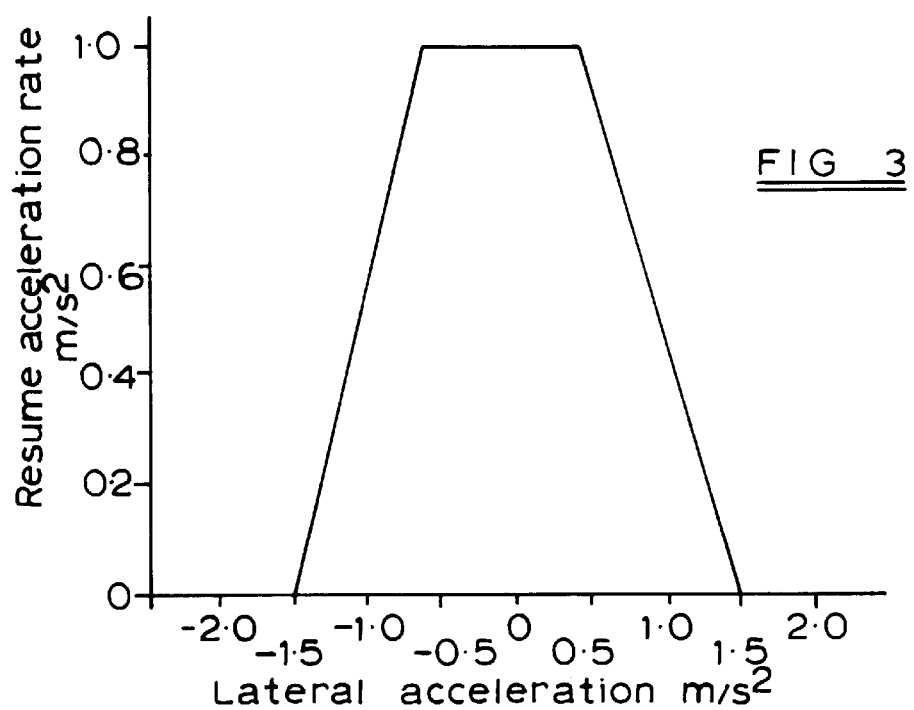
FIG. 3 represents a plot of resume acceleration rate against lateral acceleration of the equipped vehicle illustrated in FIG. 2.

Under normal motoring conditions, lateral accelerations experienced by the driver of a vehicle will generally fall within the band ±1.5 m/s$^2$. On this basis a typical variation of the resume acceleration rate with respect to lateral acceleration may be as illustrated in FIG. 3. As illustrated in FIG. 3, for lateral acceleration rates from −0.5 m/s$^2$ to +0.5 m/s$^2$, the resume acceleration rate is equal to the maximum resume acceleration rate which is typically 1.0 m/s$^2$. The resume acceleration then diminishes to zero as the lateral acceleration rate increases from −0.5 m/s$^2$ to −1.5 m/s$^2$, and from 0.5 m/s$^2$ to 1.5 m/s$^2$.

In accordance with this embodiment of the invention, if the target vehicle 40 is lost while the equipped vehicle is experiencing lateral accelerations of between −1.5 m/s$^2$ and −0.5 m/s$^2$, or between 0.5 m/s$^2$ and 1.5 m/s$^2$ the resume acceleration rate of the equipped vehicle 40 will be reduced to a rate between the maximum resume acceleration rate and zero. During overtaking manoeuvres, when lateral acceleration will normally be between −0.5 m/s$^2$ and +0.5 m/s$^2$ the resume acceleration rate will remain at its maximum preset value, so that the response of the vehicle will be unaffected. Ramping of the resume acceleration rate down to zero will also ensure that there is a smooth change in the resume acceleration rate as the equipped vehicle comes out of a bend.

Where the distance sensor 14 also measures the azimuth angle of the target vehicle 42, the resume acceleration rate may also be controlled as a function of the steering manoeuvre of the target vehicle 42. In this manner, if the target vehicle 42 is lost following a change in direction which indicates that it was entering a bend, the resume acceleration rate of the equipped vehicle 40 may be reduced, even though the equipped vehicle 40 may still be travelling in a straight line and is not experiencing lateral acceleration. Acceleration of the equipped vehicle 40 into the bend will thereby be moderated.

If measurement of the azimuth angle of the target vehicle 42 indicates that the target vehicle 42 has moved into an outer lane of a multi-lane highway, then the resume acceleration rate of the equipped vehicle 40 may be reduced to zero, so that the equipped vehicle 40 does not overtake the target vehicle 42 on the inside.

Switch means 34 may be provided to put the cruise control system into standby mode in which normal control or the vehicle speed reverts to the driver. The switch means 34 may be controlled by means of a separate cancel switch or by application of the brakes by the driver. A resume switch 36 is provided by which the driver can switch the cruise control system from the standby mode back into the normal operating mode appropriate.

What is claimed is:

1. A cruise control system for a motor vehicle comprises: means for monitoring a target vehicle moving in front of the equipped vehicle; means for monitoring the speed of the equipped vehicle; and means for monitoring the lateral acceleration rate that reflects steering maneuvers of the equipped vehicle, wherein the cruise control system controls the throttle and brake systems of the vehicle to control the speed of the vehicle; the cruise control system being switchable between a cruise mode in which it maintains a set cruising speed when the path in front of the vehicle is clear and a follow mode in which it maintains a preset headway with a target vehicle in front of the equipped vehicle; the system being switched from the cruise mode to the follow mode when the target vehicle moves inside the preset headway; the system switching from the follow mode to the cruise mode when the target vehicle is lost or moves outside the preset headway, the cruise control system applying a resume acceleration to accelerate the equipped vehicle back to the set cruising speed, the resume acceleration rate being adjusted as a function of the lateral acceleration rate of the equipped vehicle.

2. A cruise control system according to claim 1 in which the resume acceleration rate of the equipped vehicle varies between a maximum value and zero as the lateral acceleration rate of the vehicle varies between zero and of the order of ±1.5 m/s$^2$.

3. A cruise control system according to claim 1 in which the resume acceleration rate of the equipped vehicle remains at a maximum for lateral acceleration rates between −0.5 m/s$^2$ and +0.5 m/s$^2$.

4. A cruise control system according to claim 1 in which the maximum resume acceleration rate is of the order of 1.0 m/s$^2$.

5. A cruise control system according to claim 1, in which the distance sensor comprises a radar sensing system.

6. A cruise control system according to claim 5 in which the distance sensor is capable of detecting the speed, range and azimuth angle of a target vehicle.

7. A cruise control system according to claim 1 in which the distance sensor is a laser sensing system.

8. A cruise control system according claim 1 in, which the resume acceleration rate of the equipped vehicle is controlled as a function of a steering manoeuvre of the target vehicle.

9. A cruise control system according to claim 8 in which when the change in direction of the target vehicle, prior to the target vehicle being lost, indicates that the target vehicle is entering a curve, the resume acceleration rate of the equipped vehicle is reduced, even though the equipped vehicle is travelling in a straight line.

10. A cruise control system according to claim 9 in which when the movement of the target vehicle indicates that the target vehicle has moved into an outer lane of a multi-lane highway, the resume acceleration rate is reduced to zero.

* * * * *